Nov. 4, 1930.    R. S. ROBERTS ET AL    1,780,797
CONVERTIBLE VEHICLE BODY CONSTRUCTION
Filed Feb. 6, 1929    3 Sheets-Sheet 1
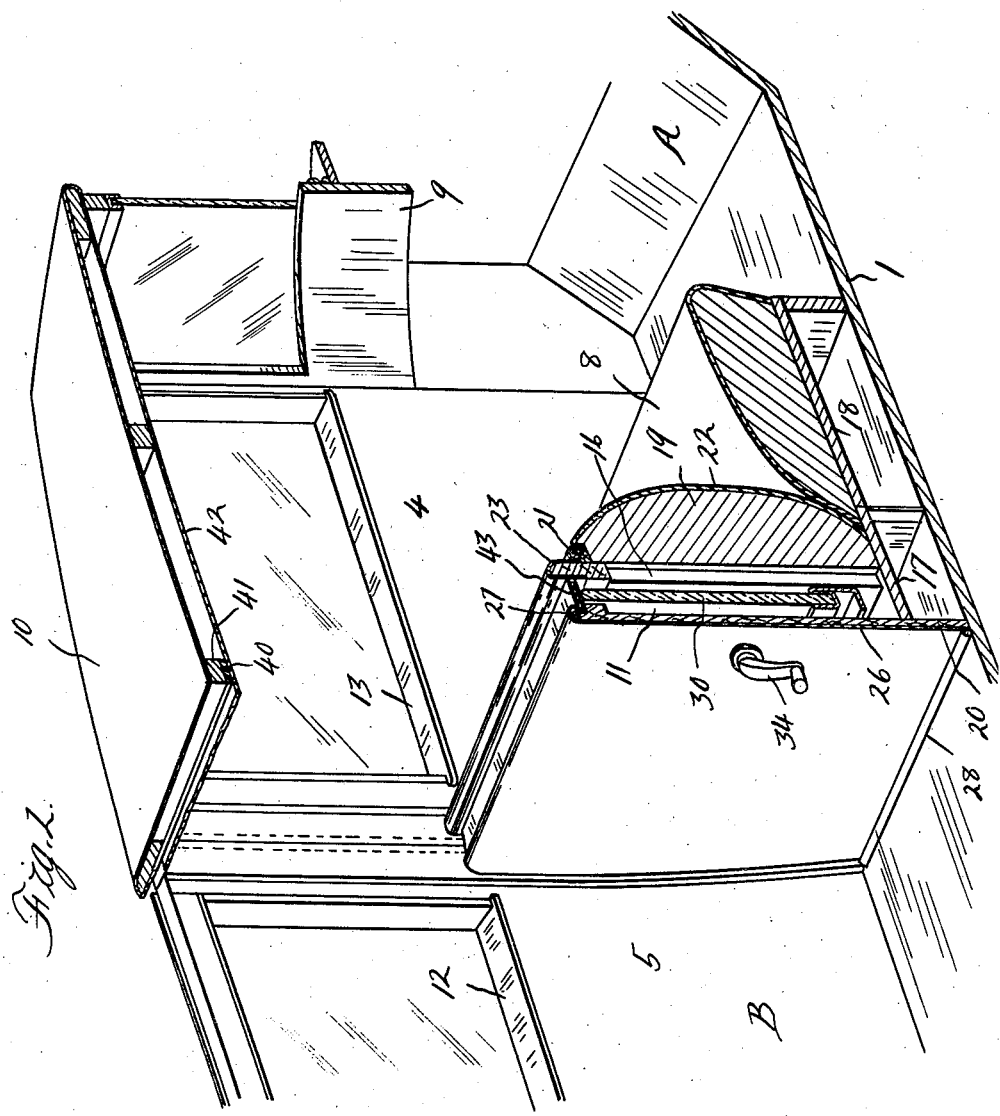
INVENTORS
Ralph S. Roberts
John Votypka
BY
ATTORNEYS

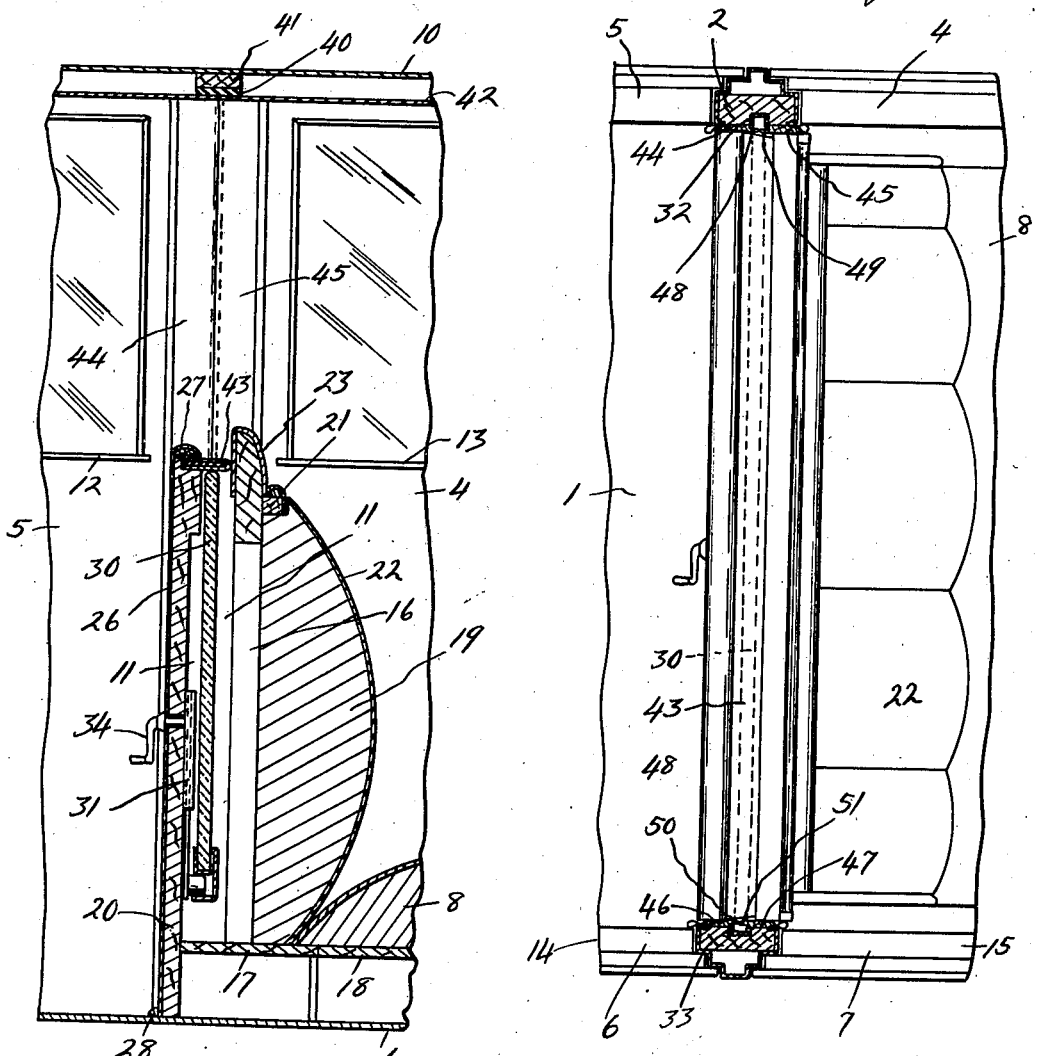

Nov. 4, 1930.  R. S. ROBERTS ET AL  1,780,797
CONVERTIBLE VEHICLE BODY CONSTRUCTION
Filed Feb. 6, 1929    3 Sheets-Sheet 3
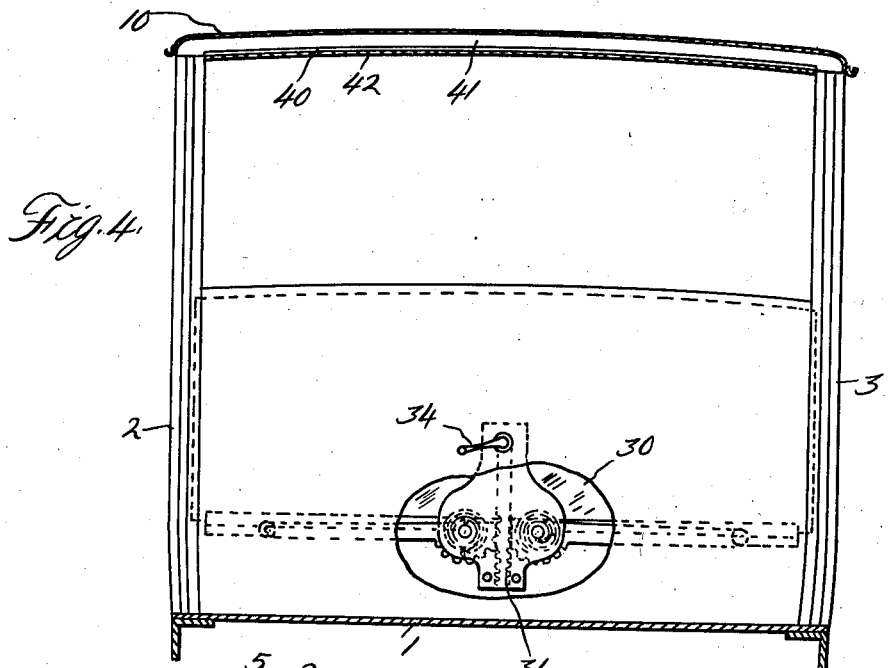
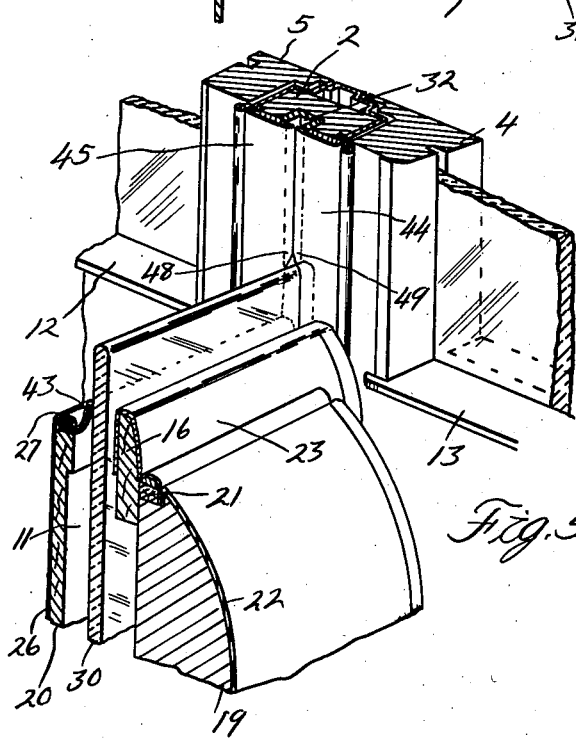
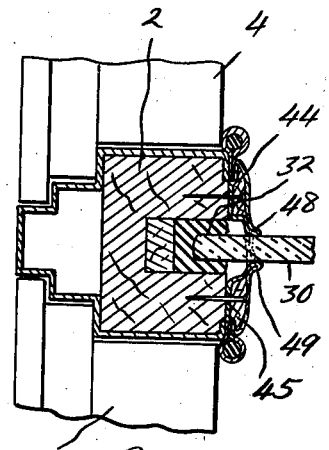
INVENTORS
Ralph S. Roberts
John Votypka
BY
ATTORNEYS Patented Nov. 4, 1930

1,780,797

UNITED STATES PATENT OFFICE

RALPH S. ROBERTS AND JOHN VOTYPKA, OF DETROIT, MICHIGAN, ASSIGNORS TO LE-BARON DETROIT COMPANY, OF DETROIT, MICHIGAN, A CORPORATION OF MICHIGAN

CONVERTIBLE VEHICLE BODY CONSTRUCTION

Application filed February 6, 1929. Serial No. 337,958.

This invention relates generally to vehicle body constructions and refers more particularly to convertible vehicle bodies.

One of the essential objects of the invention is to provide a neat and attractive body in which a vertically slidable window is utilized as a partition between the forward or driver's section and the rearward or tonneau section of the body, whereby the vehicle may be converted from a chauffeur-driven or public conveyance such as a taxicab to a private or owner driven vehicle or vice versa.

Another object is to provide a body construction of the class described in which the window and the guides therefor are entirely concealed when the window is lowered so that the vehicle has the appearance of a private or owner driven machine.

With the above and other objects in view the invention consists of certain novel features of parts, combinations and arrangements of parts that will be hereinafter more fully described in the appended claims.

In the accompanying drawings,—

Figure 1 is a fragmentary perspective view of a vehicle body embodying our invention, Figure 2 is a fragmentary vertical sectional view through the construction shown in Figure 1, Figure 3 is a fragmentary horizontally sectional view through the vehicle body construction, Figure 4 is a fragmentary vertical sectional view of the body construction and showing a portion of the rear wall of the window pocket broken away, Figure 5 is an enlarged fragmentary perspective view of the window assembly of our vehicle body construction, Figure 6 is an enlarged fragmentary horizontally sectional view through one of the intermediate pillars and glass partition.

Referring now to the drawings, 1 is the flooring, 2 and 3 are the intermediate pillars rising from said flooring at opposite sides thereof, 4, 5, 6 and 7 respectively are the swinging doors abutting against said pillars, 8 is the front seat, 9 is the instrument board, and 10 is the top of a vehicle body of the four door sedan type.

In the present instance the body is divided by an upwardly opening vertically disposed pocket 11 into a forward or driver's section A and a rearward or tonneau section B. Preferably this pocket extends between and is terminally secured to the pillars 2 and 3 and rises from a point adjacent the flooring 1 to a point in substantial horizontal alignment with the door garnish mouldings 12, 13, 14 and 15 respectively constituting the belt line of the vehicle body. The forward wall 16 of this pocket 11 is secured to a rearward extension 17 of the base 18 of the seat 8 and constitutes a brace or backer for the seat back 19, while the rear wall 20 of the pocket 11 extends below the seat base extension 17 and is secured to the flooring 1. Preferably the wood tacking strip 21 for the seat back upholstering 22 is secured to the forward wall 16 adjacent to the upper edge thereof and the said upper edge is covered by a sheet 23 of fabric upholstering or trimming material which in this instance is also secured to the tacking strip 21, while the rear wall 20 is covered by a sheet 26 of fabric trimming material that is anchored at the upper and lower edge of the wall by suitable molding strips 27 and 28.

Movable into and above this pocket 11 is a glass partition or window 30 comprising a single glass pane that is adapted to be raised and lowered by suitable lifter mechanism 31 and that is adapted to be guided in its movements by channel runways 32 and 33 in the intermediate body pillars 2 and 3. Preferably the window lifter mechanism 31 is located within the pocket 11 and is operated from the tonneau section B of the body by means of a suitable crank 34 extending through the rear wall of the pocket. Thus, with this construction, the window 30 may be raised by the crank 34 when the vehicle is to be driven by a chauffeur or used as a taxicab or public conveyance, or may be lowered by the crank 34 into the pocket 11 when the vehicle is to be driven by the owner as a private car.

To provide a neat appearance, a rubber strip 40 is utilized to cushion the glass 30 when it is raised but this strip is preferably flat and is secured between a cross bar 41 and the lining 42 of the top so that it is entirely concealed. Furthermore, a rubber flap 43 is provided at the open upper edge of the pocket 11 to conceal the window 30 when lowered, and finish strips 44, 45, 46 and 47 respectively provided with flaps 48, 49, 50 and 51 respectively are provided on the intermediate pillars 2 and 3 to conceal the runways 32 and 33. Preferably the flap 43 has one longitudinal edge portion thereof clamped between the molding strip 27 and the upper edge of the rear wall 20 of the pocket 11 and has its opposite longitudinal edge portion freely abutting the forward wall 16 whereby the said free edge portion will normally close the pocket 11 as shown in Figure 1 but may fold back as shown in Figure 5 when the window 30 is raised. The flaps 48, 49, 50 and 51 constitute yieldable lateral extensions or flanges of the finish strips 45, 46 and 47 respectively and extend upwardly from the pocket 11 to the roof 10 of the body. Normally the adjacent edges of the flaps, 46, 47, 48 and 49 substantially meet as shown in Figures 1, 3 and 5 respectively and overlap and close the runways 32 and 33, however, these flaps will fold back upon opposite sides of the window 30 as illustrated in Figure 6 when the said window is raised.

Thus from the foregoing description it will be apparent that we have provided a very useful and practical body construction, which has the appearance of and may be used as an owner driven vehicle when the glass is lowered and that may be easily and quickly converted to a chauffeur driven vehicle by merely raising the glass 30 so as to close the forward or driver's section A from the rear or tonneau section B. It will also be apparent that this construction obviates the use of unsightly headers for the glass at the top of the body and also obviates the use of additional intermediate pillars within the body above the belt. Moreover, the construction and arrangement of the flaps 48, 49, 50 and 51 and of the flap 43 is such that the general appearance of the body is enhanced as the glass 30 and runways 32 and 33 are effectively concealed when the window 30 is lowered. Furthermore, the construction and arrangement of the strip 40 is an important factor in obtaining a neat construction.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

What we claim as our invention:

1. In a vehicle body, the combination with a cross bow, a lining concealing the cross bow, and a partition below the cross bow and including a sliding window and a pocket for receiving said window, of window guides extending between the pocket and cross bow, a header of yieldable material for the window located between the cross bow and lining at the upper ends of the window guides and concealed by said lining, and means for concealing the window guides and the window when the latter is in the pocket, including strips of flexible material carried respectively by said guides and a wall of said pocket.

2. In a vehicle body, a partition including a sliding window and a pocket for receiving said window, of window guides extending upwardly from said pocket, and means for concealing said guides and window when the latter is in the pocket, including strips of flexible material carried respectively by said guides and a wall of said pocket.

3. In a vehicle body, the combination with a cross bow, and a lining concealing said bow, of a partition below the bow in substantially vertical alignment therewith and including a sliding window and a pocket for receiving the window, and a header for the window comprising a strip of yieldable material located between the lining and cross bow in the path of the sliding window and serving as a yieldable stop therefor.

4. In a vehicle body, a partition including a sliding window, and a pocket for receiving said window, of window guides extending upwardly from the pocket and having channels for receiving the window when raised above the pocket, and concealing means for said channels including strips secured to the guides and having portions of flexible material frictionally engaging opposite sides of the window when raised above the pocket and operable when the window is lowered within the pocket to overlap and substantially close the channels of the guides.

5. In a vehicle body, a partition including a sliding window and a pocket for receiving said window, of window guides extending upwardly from the pocket and having channels for receiving the window when raised above the pocket, and concealing means for said guides including strips secured to the edges of the channels and having portions of flexible material overlapping and substantially closing the channels when the window is in the pocket, but yieldable to uncover the channels when the window is raised in the guides above the pocket.

In testimony whereof we affix our signatures.

RALPH S. ROBERTS.
JOHN VOTYPKA.